United States Patent
Tupper

[19]

[11] Patent Number: 6,051,959

[45] Date of Patent: Apr. 18, 2000

[54] APPARATUS FOR RESONANT EXCITATION OF HIGH FREQUENCY ALTERNATOR FIELD

[75] Inventor: Christopher N. Tupper, Brunswick, Me.

[73] Assignee: Dirigo R&D, Brunswick, Me.

[21] Appl. No.: 09/002,121

[22] Filed: Dec. 31, 1997

[51] Int. Cl.[7] .................................................. H02P 9/10
[52] U.S. Cl. ............................................................ 322/78
[58] Field of Search .......................................... 322/6, 78

[56] References Cited

U.S. PATENT DOCUMENTS

| | | |
|---|---|---|
| 3,916,284 | 10/1975 | Hilgendorf . |
| 4,956,598 | 9/1990 | Recker et al. . |
| 4,992,920 | 2/1991 | Davis . |
| 5,780,997 | 7/1998 | Sutrina et al. . |

OTHER PUBLICATIONS

Tupper, Christopher, N., "Demonstration of the Production of 60 HZ AC Power Directly from High Frequency Alternators," Dingo/TR–95–01, Oct. 1995.

*Primary Examiner*—Thomas M. Dougherty
*Assistant Examiner*—Peter Medley
*Attorney, Agent, or Firm*—Pierce Atwood; Chris A. Caseiro

[57] ABSTRACT

A poly-phase high frequency alternator with a low-loss magnetic core is excited by a low-loss field coil that is part of a series resonant circuit tuned to a desired AC power frequency which may be 50 or 60 Hz. The series resonant circuit is excited at the resonant frequency. The resulting resonant behavior automatically provides the high driving voltages and sinusoidal energy storage patterns needed to efficiently modulate the field inductance at 50 or 60 Hz. Modulating the field at the desired AC power frequency modulates the alternator output voltage at that frequency. The poly-phase alternator output is rectified into a single phase and commutated with respect to the load at the zero crossing of each half cycle of the AC power frequency. This produces a single phase power frequency AC output.

22 Claims, 4 Drawing Sheets

APPARATUS FOR RESONANT EXCITATION OF HIGH FREQUENCY ALTERNATOR FIELD

RELATED U.S. PATENT APPLICATION

This application is related to U.S. application Ser. No. 09/002,299, filed Dec. 31, 1997, of the same inventor entitled "Low Loss Magnetic Core for High Frequency Claw Pole Type Alternator."

The U.S. government has an interest in this technology, which was developed, in part, under contracts DAAB12-95-C-0011, 1995 and DASG60-97-M-0128, 1997.

BACKGROUND OF THE INVENTION

1. Field of the Invention

This invention relates generally to the production of power frequency (50/60 Hz) AC power directly from high frequency alternators without inverters or power frequency changers, and more particularly, to an efficient method of modulating the alternator output into a power frequency sinusoid via field modulation using resonant circuit techniques.

2. Description of the Prior Art

The production of power frequency (50/60 Hz) AC power using high frequency alternators allows the engine speed to be independent of the output frequency, which allows the engine to operate at its most efficient or convenient speed, and due the high frequency, allows small units to generate high output power. Typical systems to accomplish this include the use of inverters to shape the rectified (DC) output of the high frequency alternator, or the use of power frequency conversion switching electronics to shape the high frequency output power without explicit rectification. Because these system require hard switching and manipulation of the full output current, they involve large amperage semiconductors and the associated costs, inefficiencies and heat dissipation requirements.

Hilgendorf, in U.S. Pat. No. 3,916,284, discloses a method for producing low (power) frequency AC directly from a high frequency alternator through manipulation of the field excitation. In this method the field is modulated at the desired AC power frequency and the modulated, rectified, high frequency output is commutated, with respect to the load, via soft switching at the zero crossing points of the AC power frequency output. This method eliminates the cost and losses involved with inverter or power frequency conversion manipulation of the full output current, while retaining the light weight and speed independence of high frequency alternators. Tests on the method proposed by Hilgendorf show that it suffers several major problems: the typical cores of high frequency alternators proposed by Hilgendorf consume inordinate amounts of power through eddy currents and core losses; the high inductance typical of alternator cores require high driving voltages in order to quickly charge and discharge the magnetic energy in the field; and, as proposed by Hilgendorf the energy exciting the field in each cycle is dissipated and wasted and must be replaced in the following cycle. Furthermore, the method of Hilgendorf does not account for the effect of residual magnetism in the alternator core, so the actual output voltage never does reduce to zero.

OBJECTS OF THE INVENTION

It is an object of the present invention to produce a device for producing power frequency AC power from mechanical shaft rotation, relatively independent of shaft speed, through modulated excitation of a low loss magnetic field structure and commutation of the rectified output. It is a further object of the present invention to use resonant circuit techniques to provide the sinusoidal wave shaping, and to modulate the output through zero volts. It is a further object of this invention to use the resonant circuit technique to provide the high driving voltages required by the large inductance of the field structure, and to provide for the recapture, storage and reuse of a large percentage of the field excitation energy in each cycle. It is a further object of the present invention to provide a means of exciting the field using only a single low voltage battery or DC power source. It is a further object of the present invention to provide a means of controlling the AC output of the device so that the output may be synchronized with an external reference so that the output of several such units can be coupled together to create an AC power grid.

SUMMARY OF THE INVENTION

The objects set forth above as well as further and other objects and advantages of the present invention are achieved by the embodiments of the invention described herein below. The present invention includes a shaft driven, polyphase, high frequency alternator with a low loss magnetic core structure wherein the magnetic paths are made entirely from laminated magnetic material. The field of said alternator is arranged as a low loss series resonant circuit including the inductance of the field coil, a capacitor, and the parasitic resistance which includes the field coil copper resistance and the resistance equivalent of the core losses. The resonant field circuit is tuned by selection of its reactive components to resonate at the desired AC power frequency. The polyphase high frequency output is rectified into a single rectified output. The rectified output is modulated by the resonating field at the AC power frequency. The modulated and rectified output is commutated with respect to the load on the zero crossing of each half cycle of the AC power frequency output to create an AC output. A low voltage DC control system controls a driver circuit that excites the field at the resonant frequency so that the commutated output may be synchronized with the phase and amplitude of an external AC reference. The control system is arranged to connect the AC output of the invention to an AC grid when the output is within specified tolerances of the phase and amplitude of the reference signal.

For a better understanding of the present invention, together with other and further objects thereof, reference is made to the accompanying drawings and detailed description and its scope will be pointed out in the appended claims.

DETAILED DESCRIPTION OF THE PREFERRED EMBODIMENT

Figure 1:
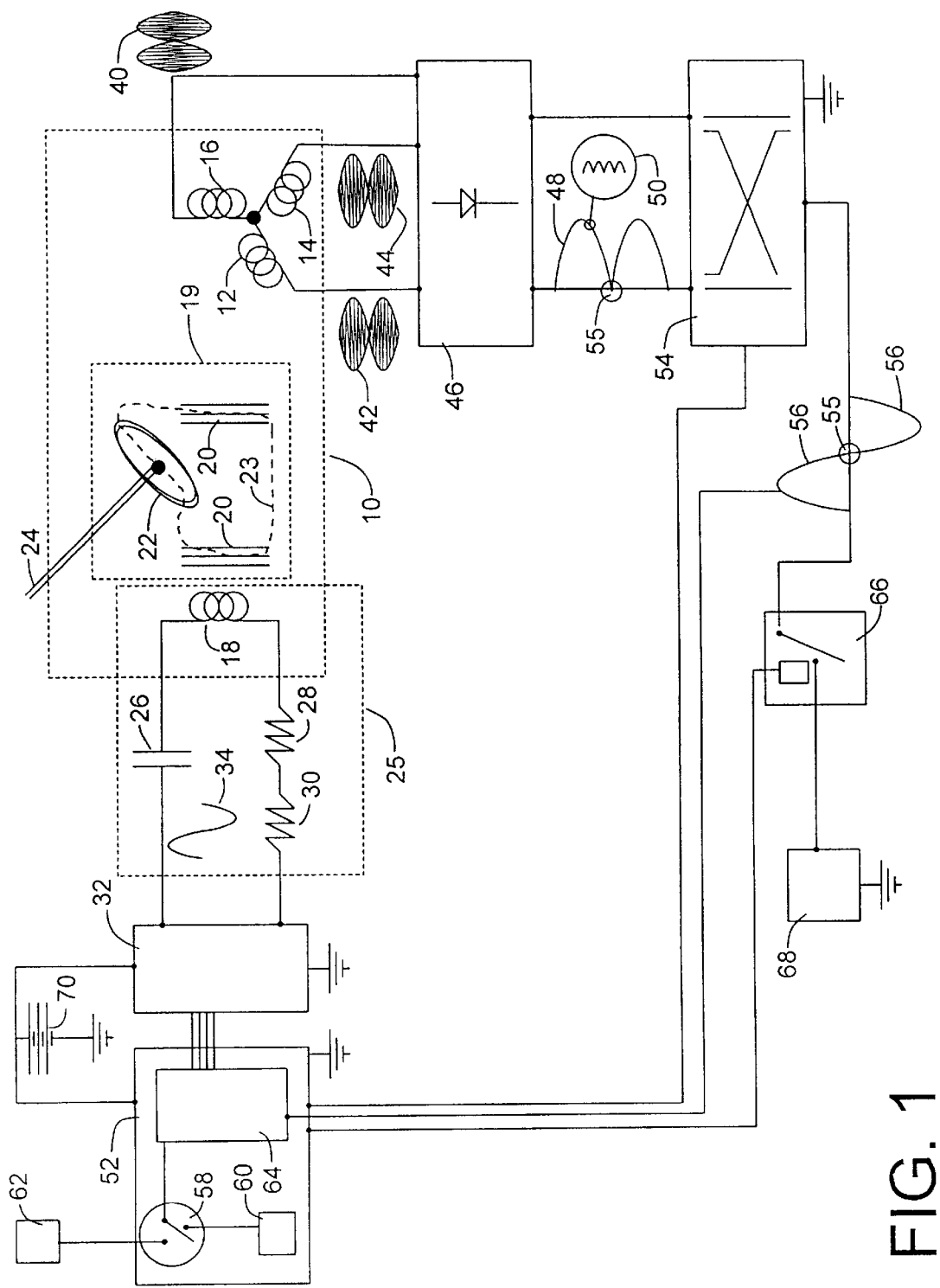
FIG. 1 is a simplified schematic diagram of the present invention.

Referring to FIG. 1, a high frequency alternator 10 of the present invention includes a plurality of polyphase armature windings 12, 14 and 16, etc., and the windings of a single phase field coil 18. These windings are coupled by a low loss magnetic core structure 19 that includes a stator 20 and a rotor 22. The low loss core structure 19 provides magnetic paths 23 which are made of low loss magnetic material; laminated magnetic steel or laminated electrical steel or other material suitable to provide high magnetic permeability with low core losses. One example of a suitable magnetic core structure is given in the related U.S. patent application Ser. No. 09/002,299, filed Dec. 31, 1997, entitled "Low Loss Magnetic Core for High Frequency Claw Pole Type Alternator." The rotor 22 is driven by a shaft 24 which provides means for coupling external rotary mechanical power into the alternator. The single phase field coil 18 may or may not be located on the rotor 22 depending upon the design. The magnetic field induced by excitation of the field coil 18 is moved by the rotation of the rotor 22 and high frequency alternating voltage is induced in the armature windings 12, 14, 16 due to this variation.

The single phase field coil 18 is part of a series resonant circuit 25 which also includes a capacitor 26, and a parasitic copper resistance 28 of the field coil 18, and an equivalent resistance 30 of the parasitic core losses from eddy current and hysteresis losses in the magnetic core structure 19. A driver circuit 32 excites the series resonant circuit 25. By selection of field coil 18 inductance and capacitor 26 component values the resonant frequency is tuned to match the desired AC power frequency, which may be 50 or 60 Hz. By careful design of the field coil 18 and low loss magnetic core structure 19, the peak magnetic energy stored in the field coil 18 during each half cycle is at least two times greater than the energy dissipated in the resistance of elements 28 and 30 during the half cycle. The following equations apply:

I=current in series resonant circuit 25, rms amps

L=inductance of field coil 18, henries

R=series sum of parasitic resistance from field coil copper 28 and equivalent resistance 30 of magnetic core structure core losses, ohms.

Fo=Resonant Frequency, Hz

ERH=energy dissipated in parasitic resistances 28, 30 during each half cycle, joules.

ERH=I*I*R/(2*Fo)

ELP=peak energy stored in field coil 18 in each half cycle, joules.

ELP=I*I*L

ELP>2* ERH

At resonance the energy stored in the magnetic field of the field coil 18 is in opposite phase from the energy stored in the capacitor 26. The energy is stored alternately in capacitor 26 and then the field coil 18 over the course of one cycle. The energy losses in the resonant circuit 25 are those in resistive elements 28 and 30. By limiting the resistive losses, a large portion of the field energy is recaptured, stored and reused each cycle by the natural resonant behavior of the circuit.

Furthermore, as is well know, at resonance the driving voltages of the capacitor 26 and the inductance of the field coil 18 are in opposite phase and are of equal magnitude and thus, cancel each other. The driver circuit 32 need only supply voltage to overcome the impedance of the resistance elements 28, 30. The capacitor 26 and field coil 18 inductance will provide the needed high resonant voltages for each other. The resonant voltage will be a multiple of the driver voltage; this multiple is known as resonant factor Q and is pi ($\pi$) times the ratio of peak energy stored in the reactive elements during each half cycle to the energy lost to the resistive elements in each half cycle. Thus the series resonant circuit 25 achieves the objectives of storing and reusing a large portion of the field energy, and providing the high driving voltages needed to quickly energize and de-energize the field. The following equations apply:

Q=resonant "quality" factor

Q=3.14159 * (ELP/ERH)

The driver 32 excites a sinusoidal resonant current 34 in the series resonant circuit 25 which incorporates the field coil 18. The magnetic flux level in the magnetic core structure 19 follows this sinusoidal variation of the field current. The induced voltage in the armature coils 12, 14, 16 is modulated by the sinusoidal variation of the magnetic flux, achieving the objectives of modulating the output voltages 40, 42, 44 of the polyphase armature windings through zero and shaping the output into a sinusoidal form.

In order for the sinusoidal current 34 from resonance to bring about a sinusoidal flux variation in the field coil 18 and armature coils 12,14, 16, the nominal magnetic flux levels within the magnetic materials of the low loss magnetic core structure 19 should remain at values less than the magnetic saturation level for the material. Some localized high frequency excursions into flux saturation due to output current reactions, etc., are tolerable within armature poles as long as the overall AC power frequency flux variation stays below the saturation levels.

The polyphase armatures of FIG. 1 are connected in Wye configuration, or in other embodiments in Delta configurations in a manner well understood in the art. The high frequency AC outputs 40, 42 and 44, are combined via natural commutation in a rectifier circuit 46 of any type understood by one skilled in the field to produce a single phase rectified, output 48. Because of the resonant excitation of the series resonant circuit 25 and the sinusoidal variation of the field current 34 the combined output 48 of the rectifier 46 is also modulated to follow the AC power frequency sinusoidal waveform of the resonant excitation. This rectified output 48 has a small high frequency ripple 50 due to the natural commutation of the rectifier 46 as it combines the high frequency AC armature outputs 40, 42, 44. In order for AC power frequency modulation of the combined output 48 to be substantially independent of the high frequency ripple 50 said high frequency ripple needs to be at least seven times faster than the AC power frequency modulation.

A control circuit 52 drives a solid state commutation system 54 at each zero crossing 55 and, with soft switching, unfolds the rectified output into the desired AC power frequency AC output 56. Said commutation system can be either an H bridge in series with the rectified output 48 as shown, or in another embodiment, it can be a second rectifier system in parallel with, but of opposite polarity to, rectifier 46, with each rectifier being disabled during appropriate periods. Typically such parallel rectifiers would be constructed using thyristors with each rectifier being enabled by the control system 52 for the periods between alternate zero crossings 55, in a manner well understood in the art.

The control circuit 52 has a means 58 for manually switching between either an internal reference 60 or an external AC power frequency (line) reference 62. A feed back control circuit 64 controls the amplitude and phase of the driver 32 so that the device output 56 is synchronized with the chosen reference. The control circuit 52 also measures the error of the phase and amplitude. When the errors are within specified tolerances, the control circuit 52 generates logic signals to control a means 66 such as a relay or solid state switch of connecting the AC power frequency output 56 to a power grid 68 or other load. The power grid 68 may, in fact, be the same as the external reference 62.

Although any suitable source may provide electrical power, for many applications it is most convenient if a uni-polar low voltage battery 70 or DC power supply, typically 12 or 24 volts, powers both the control circuit 52 and the driver circuit 32. The driver 32 may simply be a power amplifier controlled by signals from the feedback control circuit 64.

Figure 2:
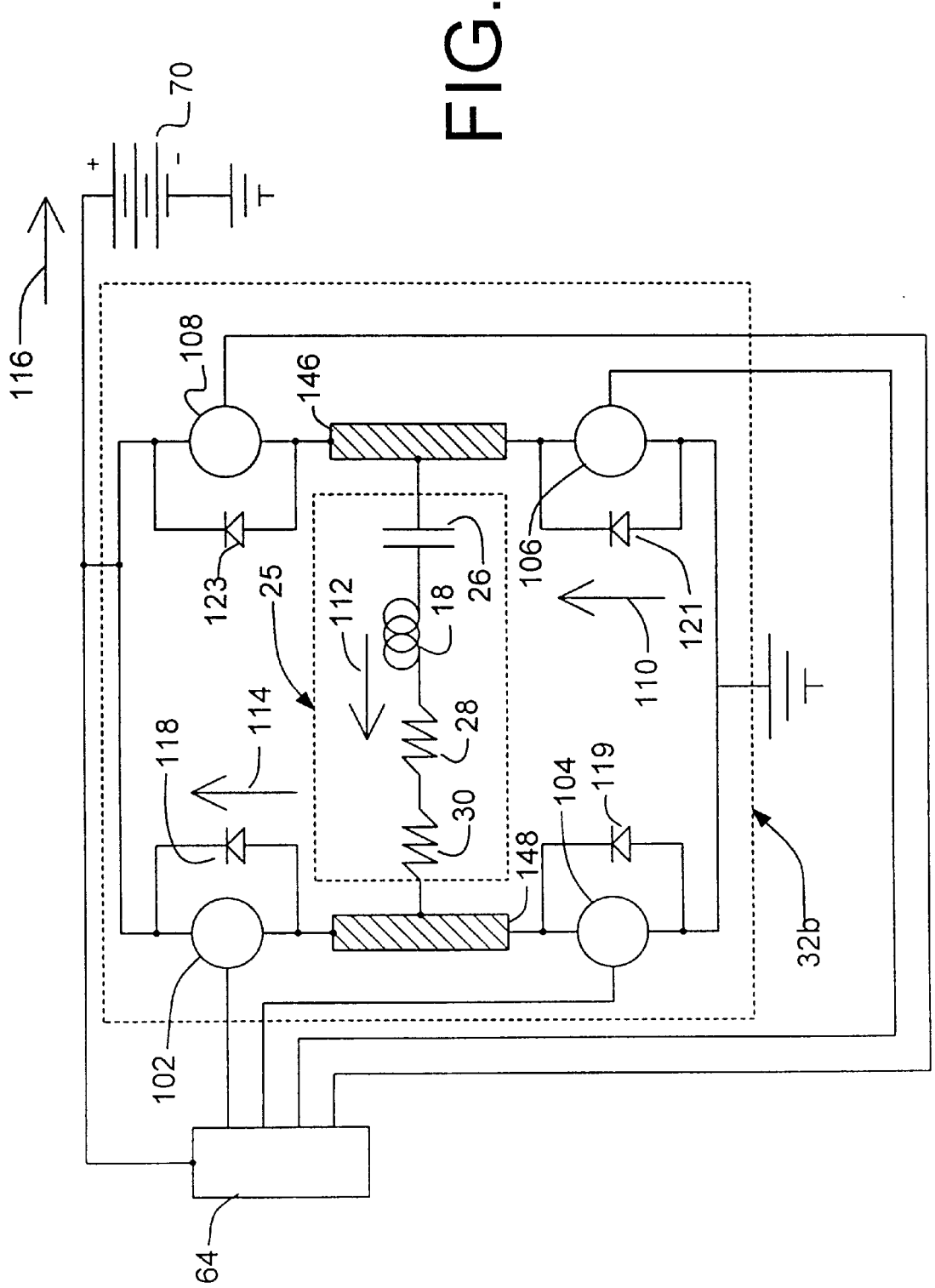
FIG. 2 is a detail circuit for the field excitation circuit using a pulse width modulation circuit.

FIG. 2 shows an alternate embodiment for the driver 32 using a pulse width modulation driver 32b including an H-bridge of semiconductor switches 102, 104, 106, and 108 connected to the series resonant circuit 25. Arrows 110, 112, 114, 116 show a typical free-wheel current path for times when the switches are all off and the resonant current needs to flow. Typically the semiconductor switches include free-wheel diodes such as 118, 119, 121, 123 that allow reaction currents to flow automatically. Forward conduction in semiconductor switches 102, 104, 106, 108 is enabled at the appropriate times by signals from the control circuits including circuit 64.

Figure 3:
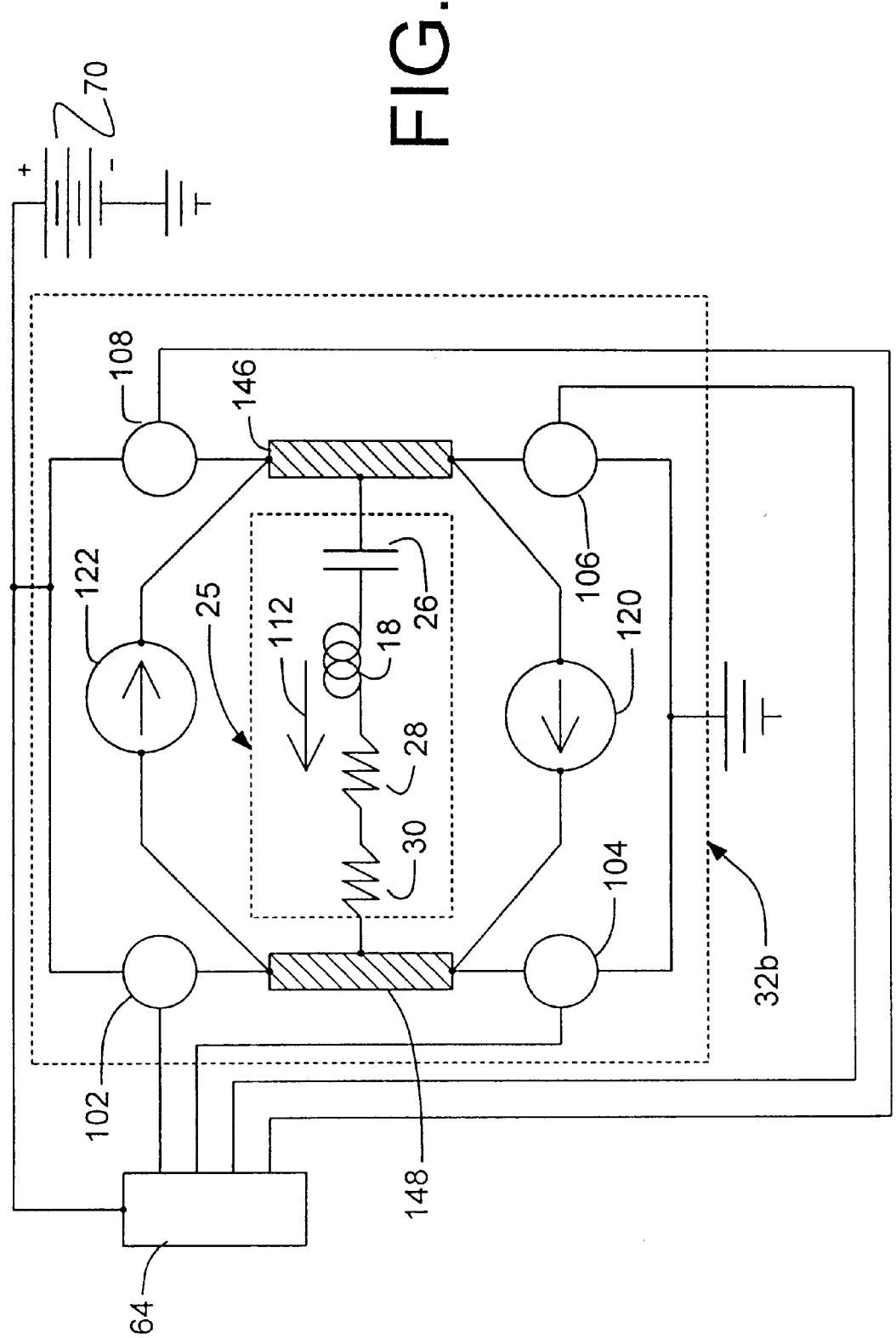
FIG. 3 is a schematic of a pulse width modulation driver with alternative free wheel current paths to enhance the performance.

FIG. 3 shows an alternate embodiment of the pulse width modulated driver incorporating two improved free-wheel paths, 120, 122 which bypass the semiconductor switches 102, 104, 106, and 108 and avoid returning current to the battery 70. This technique avoids heating the battery 70. Bypassing the battery 70 during the freewheeling portion of the cycle makes the resonant excitation more efficient and reduces the harmonic content of the resulting excitation current waveform 34. Each freewheel path 120, 122 allows freewheeling in only one direction. The two freewheel paths are connected in opposite polarity with respect to the connection points at the two ends of the series resonant circuit 25, said connection points henceforth being referred to as bus elements 146 and 148. Each freewheel path 120, 122 is enabled during the appropriate periods of the conduction cycle by signals from the control system 64.

Figure 4:
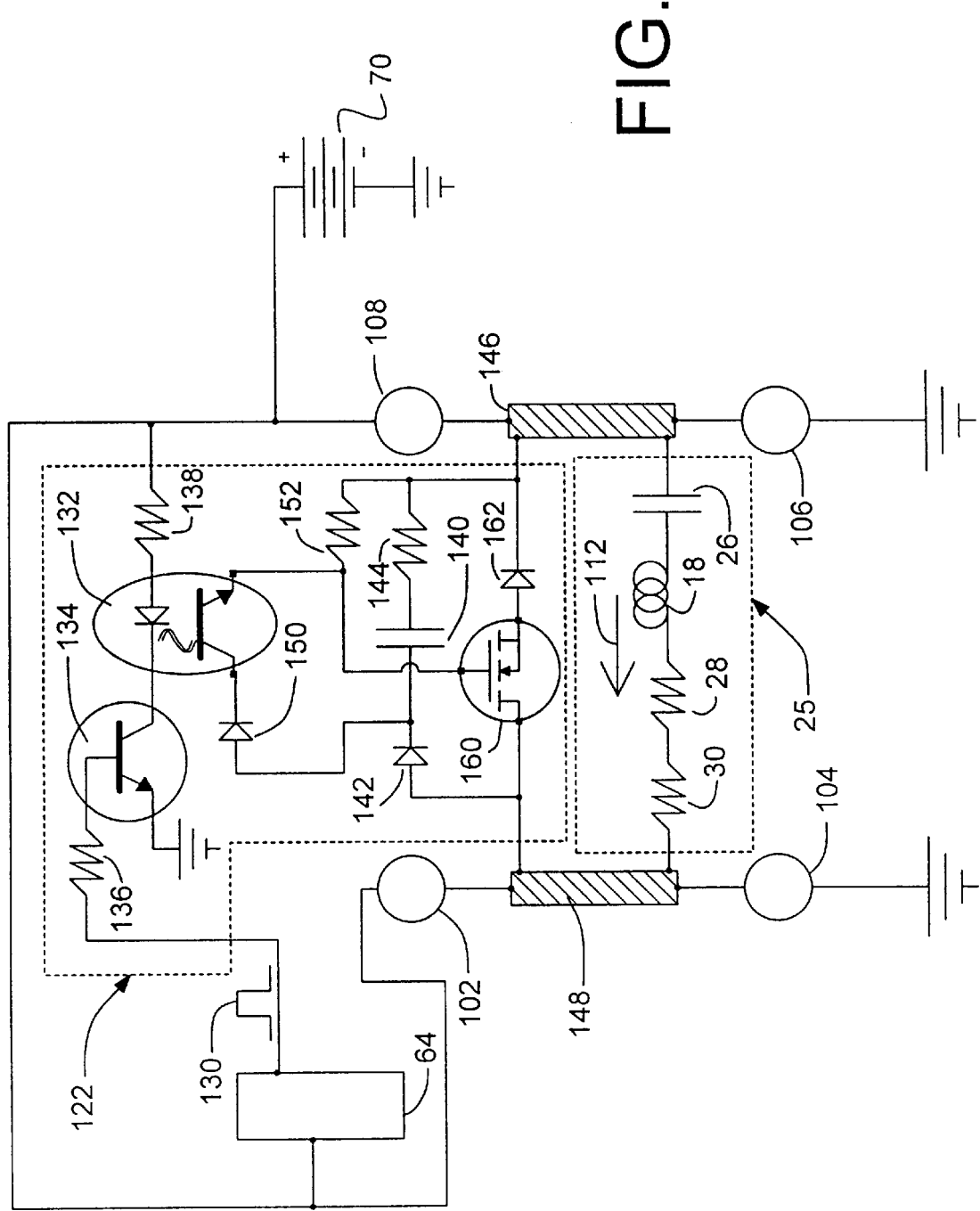
FIG. 4 is a detail circuit diagram for a freewheel path that improves the performance of the pulse width modulation excitation of the resonant circuit.

FIG. 4 illustrates one embodiment of one alternate free-wheel path 122 and shows a self-charging, optically-enabled circuit for conducting the freewheeling current during half the resonant cycle in which the field excitation current flows as shown by arrow 112, that is during the half cycle when bus element 146 is nominally connected to the positive terminal of the power supply 70 via switch 108. Control signal 130 from controller 64 turns on the opto-transistor 132 by turning on transistor 134, which is regulated by resistors 136 and 138. Capacitor 140 provides the energy for the transistor portion of opto-transistor 132. Capacitor 140 is automatically charged by the connections of diode 142 and resistor 144 to the bus elements 146 and 148 during the half cycle that bus element 148 is nominally connected to the positive terminal of power supply 70 via switch 102. The optical signal caused by the control signal 130 allows conduction through transistor 132, diode 150, and resistor 152. This turns on the semiconductor switch 160 and allows the free-wheel current to pass through the switch 160 and through diode 162 and to continue to circulate through the resonant circuit 25 even when the H-Bridge switches, 102, 104, 106, 108 are all closed. When the H-Bridge switches 108 and 104 are open, the voltages on bus elements 146 and 148 reverse-bias the free wheel circuit 122 which automatically becomes idle because diodes 142 and 162 prevent reverse conduction. When signal 130 is off, the conduction in switch 160 is blocked and the freewheel path 122 is disabled. Free wheel path 120 is a similar circuit but has reversed connections to bus elements 146 and 148 and allows freewheeling during the opposite half cycle.

Although the invention has been described with respect to various embodiments, it should be realized this invention is also capable of a wide variety of further and other embodiments within the spirit and scope of the appended claims.

What is claimed is:

1. An apparatus for generating AC power from the rotation of a shaft, wherein power generation is independent of the speed of the shaft, said apparatus comprising:
   a. a plurality of low-loss armature poles including magnetic paths and armature coils, wherein each of said armature coils has an individual output;
   b. a low-loss rotor with one or more magnetic paths, wherein said rotor is couplable to the shaft so that rotation of the shaft will cause variation of the magnetic flux level in said armature poles;
   c. a field coil means for exciting said magnetic path of said rotor and said armature poles, wherein said field coil means forms part of a series resonant circuit including:
      (i) an inductance of said field coil means;
      (ii) a capacitor selected to tune said resonant circuit to a desired low frequency;
      (iii) a driver to excite resonant behavior of said resonant circuit; and
      (iv) an equivalent resistance equal to a parasitic resistance of said field coil means plus a loss resistance from eddy currents and magnetic-path losses associated with said low-loss armature poles and said low-loss rotor, wherein said equivalent resistance is designed so that peak energy stored in the inductor in each half cycle is at least two times greater than the energy lost in the parasitic resistance during each half cycle;
   d. a rectifier system to connect said individual outputs of said armature coils into a single-phase rectified output;
   e. a load-commutation system for switching the polarity of the electrical connection between a load and said rectified output to produce a commutated output on each half cycle at zero-voltage output crossings;
   f. a feedback control circuit that:
      (i) controls the excitation of said field coil means so that said commutated output and said rectified output will match the phase and amplitude of a reference signal;
      (ii) controls load-commutation switching of said load-commutation system at said zero-voltage output zero crossings; and
      (iii) controls connection of said commutated output and said rectified output to an external load or grid when the phase or amplitude is within specified tolerances; and
   g. a driver circuit to excite sinusoidal resonant currents in said field coil means based upon commands from said feedback control circuit, wherein said driver circuit is designed to minimize its own internal losses.

2. The apparatus as in claim 1, wherein said rectifier system includes a plurality of diodes providing natural commutation and wherein said load-commutation system includes a semiconductor H-Bridge with semiconductor switches selectable by said feedback control circuit.

3. The apparatus as in claim 2, wherein said driver circuit includes a power amplifier which provides a sinusoidal voltage stimulation for said series resonant circuit and is regulated by signals from said feedback control circuit.

4. The apparatus as in claim 2, wherein said driver circuit includes a pulse-width-modulation circuit including an H-Bridge connecting said series resonant circuit incorporating said field coil means to a low-voltage uni-polar DC power supply.

5. The apparatus as in claim 1, wherein said rectifier system includes two parallel sets of thyristors arranged in opposite polarity, wherein each of said parallel sets is activated in turn by control signals from said feedback control circuit and wherein each of said parallel sets is arranged to provide natural commutation when activated, and wherein said load-commutation system includes means for alternating selection of each of said parallel sets of thyristors to reverse the polarity of rectification with respect to the load.

6. The apparatus as in claim 3, wherein said driver circuit includes a power amplifier which provides a sinusoidal voltage stimulation for said series resonant circuit and is regulated by signals from said feedback control circuit.

7. The apparatus as in claim 5, wherein said driver circuit includes a pulse-width-modulation circuit including an H-Bridge connecting said series resonant circuit incorporating said field coil means to a low-voltage uni-polar DC power supply.

8. The apparatus as in claim 1, wherein said driver circuit includes a power amplifier which provides a sinusoidal voltage stimulation for said series resonant circuit and is regulated by signals from said feedback control circuit.

9. The apparatus as in claim 1, wherein said driver circuit includes a pulse-width-modulation circuit including an H-Bridge connecting said series resonant circuit incorporating said field coil means to a low-voltage uni-polar DC power supply.

10. The apparatus as in claim 9, wherein said pulse-width-modulation circuit includes an H-Bridge and two alternate free-wheel paths selectable by solid-state switches, wherein each of said solid-state switches allows current circulation through said field coil means in a specific direction, with the direction of current through one of said free-wheel paths being the opposite of current through the other of said free-wheel paths, wherein each of said free-wheel paths allows current to bypass said power supply of said driver circuit and imposes a minimal voltage drop when enabled, and wherein each of said free-wheel paths is enabled for an appropriate half cycle by control signals from said feedback control circuit.

11. The apparatus as in claim 10, wherein each of said alternate free-wheel path includes:
   a. a semiconductor switch and diode in series and in reverse parallel with said series resonant circuit and, when enabled, providing a free-wheel path for the current of said series resonant circuit;
   b. means for optically-enabling said semiconductor switch, said means comprising an opto-transistor forming part of an opto-transistor circuit arranged to provide gate voltage for said semiconductor switch, and a diode to sustain high reverse voltage without damage to said opto-transistor;
   c. means for providing energy to said opto-transistor circuit, said means comprising a diode, a capacitor and a resistor connected in reverse parallel across said series resonant circuit, so that said capacitor will charge at a rate regulated by said resistor during periods when the voltage of said series resonant circuit is reversed, and so that said diode will prevent discharge of said capacitor except through said opto-transistor circuit when the voltage of said series resonant circuit is normal; and
   d. means for activating said opto-transistor, said means comprising a light-emitting diode integral to said opto-transistor and a series circuit powered by said feedback control circuit, said series circuit comprising a resistor to regulate current flow and a transistor switch, wherein said transistor switch is activated by a signal from said feedback control circuit.

12. The apparatus as in claim 1, wherein said low-loss armature poles include magnetic paths comprising low-core-loss magnetic material and said low-loss rotor includes magnetic paths comprising low-core-loss magnetic material.

13. The apparatus as claimed in claim 12, wherein said low-care-loss magnetic material of said magnetic paths of said low-loss armature poles and said low-loss rotor is a material having high-magnetic permeability with low core loss.

14. The apparatus as claimed in claim 13, wherein said material is selected from the group consisting of laminated magnetic steel and laminated electrical steel.

15. The apparatus as in claim 12 wherein said feedback control circuit limits excitation of said field coil means such that the magnetic flux level induced in said magnetic paths of said low-loss armature poles and said low-loss rotor is less than the magnetic saturation levels of said low-core-loss magnetic materials.

16. An apparatus for generating AC power from the rotation of a shaft, wherein power generation is independent of the speed of the shaft, said apparatus comprising:
   a. a plurality of low-loss armature poles including magnetic paths and armature coils, wherein each of said armature coils has an individual output;
   b. a low-loss rotor with one or more magnetic paths, wherein said rotor is couplable to the shaft so that rotation of the shaft will cause variation of the magnetic flux level in said armature poles; and
   c. a field coil means for exciting said magnetic path of said rotor and said armature poles, wherein said field coil means forms part of a series resonant circuit including:
      (i) an inductance of said field coil means;
      (ii) a capacitor selected to tune said resonant circuit to a desired low frequency;
      (iii) a driver to excite resonant behavior of said resonant circuit; and
      (iv) an equivalent resistance equal to a parasitic resistance of said field coil means plus a loss resistance from eddy currents and magnetic-path losses associated with said low-loss armature poles and with said low-loss rotor, wherein said equivalent resistance is designed so that peak energy stored in the inductor in each half cycle is at least two times greater than the energy lost in the parasitic resistance during each half cycle.

17. The apparatus as in claim 16, further comprising a rectifier system to connect said individual outputs of said armature coils into a single-phase rectified output, and a load-commutation system for switching the polarity of the electrical connection between a load and said rectified output to produce a commutated output on each half cycle at zero-voltage output crossings.

18. The apparatus as in claim 17, further comprising a feedback control circuit that:
   a. controls the excitation of said field coil means so that said commutated output and said rectified output will match the phase and amplitude of a reference signal;

b. controls load-commutation switching of said load-commutation system at said zero-voltage output zero crossings; and c. controls connection of said commutated output and said rectified output to an external load or grid when the phase or amplitude is within specified tolerances.

19. The apparatus as in claim 18, wherein the frequency of ripple voltage of said rectified single phase output is at least seven times the frequency of the reference signal.

20. The apparatus as in claim 18, further comprising a driver circuit to excite sinusoidal resonant currents in said field coil means based upon commands from said feedback control circuit, wherein said driver circuit is designed to minimize its own internal losses.

21. The apparatus as in claim 16, wherein said low-loss armature poles include magnetic paths comprising low-core-loss magnetic material and said low-loss rotor includes magnetic paths comprising low-core-loss magnetic material.

22. The apparatus as claimed in claim 21, wherein said low-core-loss magnetic material of said magnetic paths of said low-loss armature poles and said low-loss rotor is a material having high-magnetic permeability with low core loss.

* * * * *